(12) United States Patent
Reinhardt et al.

(10) Patent No.: US 8,923,924 B2
(45) Date of Patent: Dec. 30, 2014

(54) EMBEDDED ELEMENT ELECTRONICALLY STEERABLE ANTENNA FOR IMPROVED OPERATING BANDWIDTH

(71) Applicant: Raytheon Company, Waltham, MA (US)

(72) Inventors: Victor S. Reinhardt, Rancho Palos Verdes, CA (US); Jar J. Lee, Irvine, CA (US); Fangchou Yang, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 200 days.

(21) Appl. No.: 13/722,506

(22) Filed: Dec. 20, 2012

(65) Prior Publication Data

US 2014/0179240 A1    Jun. 26, 2014

(51) Int. Cl.

| | |
|---|---|
| H04M 1/00 | (2006.01) |
| H04B 1/06 | (2006.01) |
| H01Q 21/00 | (2006.01) |
| H01Q 1/52 | (2006.01) |
| H01Q 21/28 | (2006.01) |
| H01Q 5/00 | (2006.01) |
| H04B 15/00 | (2006.01) |
| H01Q 21/30 | (2006.01) |
| H01Q 3/26 | (2006.01) |

(52) U.S. Cl.
CPC ............... *H01Q 1/523* (2013.01); *H01Q 1/521* (2013.01); *H01Q 3/26* (2013.01); *H01Q 21/28* (2013.01); *H01Q 5/0075* (2013.01); *H04B 15/00* (2013.01); *H01Q 21/30* (2013.01)
USPC ..................... 455/562.1; 455/272; 455/276.1; 343/893

(58) Field of Classification Search
CPC ..... H01Q 5/00; H01Q 5/0001; H01Q 5/0075; H01Q 3/26; H01Q 3/28; H01Q 3/30; H01Q 21/28; H01Q 21/30
USPC .................. 455/560, 562.1, 272, 276.1, 289; 343/893
See application file for complete search history.

(56) References Cited

U.S. PATENT DOCUMENTS 5,319,377 A    6/1994  Thomas et al.
5,485,167 A *  1/1996  Wong et al. ................... 343/753

(Continued)

FOREIGN PATENT DOCUMENTS

| DE | 2505364 A1 | 8/1976 |
| EP | 0618641 A2 | 10/1994 |
| EP | 2482380 A1 | 8/2012 |

*Primary Examiner* — Duc M Nguyen (74) *Attorney, Agent, or Firm* — Burns & Levinson LLP; Joseph M. Maraia; Weber Hsiao (57) ABSTRACT

A system and method for processing antenna signals are provided. For example, the method includes, in a receive mode, weighting and combining signals from at least one low-band antenna radiator element operable over a first bandwidth, at least one high-band antenna radiator element operable over a second bandwidth at least partially overlapping the first bandwidth, and, in some examples, at least one antenna radiator element operable over one or more intermediate bandwidths. The method also includes, in a transmit mode, separating and weighting a full-band input port signal into at least one low-band sub-system output port signal, at least one high-band sub-system port output signal, and, in some examples, at least one intermediate sub-system output port signal operable over one or more overlapping intermediate bandwidths. The weighted combination and weighted separation cover an uninterrupted continuous full-band frequency whose extent covers the full frequency range of all subbands.

26 Claims, 3 Drawing Sheets

(56) References Cited

U.S. PATENT DOCUMENTS

| | | | |
|---|---|---|---|
| 6,211,841 B1* | 4/2001 | Smith et al. | 343/813 |
| 6,816,124 B2* | 11/2004 | Tillery | 343/797 |
| 6,911,947 B1* | 6/2005 | Cranor et al. | 343/741 |
| 7,050,019 B1 | 5/2006 | Jacomb-Hood et al. | |
| 7,369,828 B2* | 5/2008 | Shamsaifar | 455/193.1 |
| 7,999,756 B2* | 8/2011 | Worl et al. | 343/893 |
| 8,350,763 B2* | 1/2013 | Rappaport | 343/702 |
| 2007/0135171 A1* | 6/2007 | Hara | 455/562.1 |
| 2010/0117917 A1 | 5/2010 | Kindt et al. | |
| 2012/0068880 A1* | 3/2012 | Kullstam et al. | 342/54 |

* cited by examiner

EMBEDDED ELEMENT ELECTRONICALLY STEERABLE ANTENNA FOR IMPROVED OPERATING BANDWIDTH

BACKGROUND

Continuous ultra-wideband mission payloads utilizing electronically steerable arrays (ESAs) and other antennas are needed for radar, electronic warfare (EW) and communications. For these applications, space for multiple ESA apertures is restricted. Thus, single-aperture ESAs and other antennas with continuous ultra-wideband frequency coverage are highly desirable. Current ESA radiating (radiator) element technology limits single ESA and other antenna apertures to continuous bandwidth ratios on the order of 9:1, while 30:1 ratios and greater are highly desirable.

SUMMARY

This disclosure relates generally to the field of signal processing. More particularly, the disclosure describes an approach for compensating for negative interactions between two or more sets of overlapping radiator elements that are interleaved to achieve a combined continuous bandwidth within a single antenna aperture whose extent covers the full frequency range of all subbands.

In some aspects, this disclosure provides an antenna system. The antenna system includes a common antenna aperture. The common antenna aperture includes a low-band antenna sub-system including at least one low-band antenna radiator element operable over a first bandwidth and one or more low-band antenna sub-system ports providing one or more low-band sub-system port signals. The common antenna aperture includes a high-band antenna sub-system including at least one high-band antenna radiator element operable over a second bandwidth, at least partially overlapping the first bandwidth, and one or more high-band antenna sub-system ports providing one or more high-band sub-system port signals. The antenna system includes a signal processor electrically coupled to one or more full-band ports, and electrically coupled to at least one low-band sub-system port and at least one high-band sub-system port. The signal processor, in a receive mode, weights and combines the one or more low-band sub-system port signals and one or more high-band sub-system port signals to provide, at the one or more full-band ports, uninterrupted continuous full-band frequency coverage whose extent covers the full frequency range of a low-band and high-band.

The signal processor, in a transmit mode, separates and weights one or more provided full-band input port signals into one or more low-band sub-system output port signals and into one or more high-band sub-system port output signals. The signal processor weights and separates such that a radio frequency field radiating from the low-band and high-band antenna sub-systems, combined, provides uninterrupted continuous full-band frequency coverage whose extent covers the full frequency range of the low-band and high-band.

In some aspects, this disclosure provides a process for processing signals. The process includes providing within a common antenna aperture a low-band antenna sub-system including at least one low-band antenna radiator element operable over a first bandwidth and one or more low-band antenna sub-system ports providing one or more low-band sub-system port signals. The process includes providing within the common antenna aperture a high-band antenna sub-system including at least one high-band antenna radiator element operable over a second bandwidth, at least partially overlapping the first bandwidth, and one or more high-band antenna sub-system ports providing one or more high-band sub-system port signals. The process includes, in a receive mode, weighting, independently, the one or more low-band sub-system port signals and one or more high-band sub-system port signals, and combining the one or more low-band sub-system port signals and one or more high-band sub-system port signals to provide one or more full-band port signals covering an uninterrupted continuous full-band frequency over a combined bandwidth greater than either of the first or second bandwidths. The process includes, in a transmit mode, separating one or more provided full-band input port signals into one or more low-band sub-system output port signals and one or more high-band sub-system port output signals, and weighting the one or more low-band sub-system output port signals and the one or more high-band sub-system port output signals. The process separates and weights such that a radio frequency field radiating from the low-band antenna sub-system and high-band sub-system, combined, provides uninterrupted continuous full-band frequency coverage.

In other examples, any of the aspects above can include one or more of the following features.

In some examples of the antenna system, the signal processor weights and combines the one or more low-band sub-system port signals and one or more high-band sub-system port signals, and separates and weights the one or more provided full-band input port signals with conjugate weight matching.

In some examples of the antenna system, the low-band antenna sub-system includes a plurality of low-band antenna radiator elements and the high-band antenna sub-system includes a plurality of high-band antenna radiator elements.

In other examples of the antenna system, the plurality of low-band antenna radiator elements is interleaved with the plurality of high-band antenna radiator elements, within the common antenna aperture.

In other examples of the antenna system, the at least one low-band antenna radiator element and the at least one high-band antenna radiator element are electronically steerable across a scan angle measured with respect to the common antenna aperture.

In some examples of the antenna system, the at least one low-band antenna radiator element and the at least one high-band antenna radiator element are mechanically steerable in a single aperture antenna across a scan angle.

In some examples of the antenna system, a polarization of the at least one low-band antenna radiator element and the at least one high-band antenna radiator element are selected from the group consisting of: linear polarization; cross polarization; elliptical polarization; and circular polarization.

Other examples of the antenna system further include at least one signal converter in electrical communication between the signal processor, and the low-band antenna sub-system and the high-band antenna sub-system, the signal converter adapted to convert between digital and analog signal representations.

Some examples of the antenna system further include an electronically accessible memory in electrical communication with the signal processor, the electronically accessible memory storing respective predetermined weighting parameters for the at least one low-band antenna radiator element and the at least one high-band antenna radiator element.

In other examples of the antenna system, the respective predetermined weighting parameters are arranged in a lookup table according to one or more of frequency and antenna array scan angle.

In some examples of the antenna system, the at least one low-band antenna radiator element is selected from the group consisting of: monopoles, dipoles, crossed dipoles, patches, flared notches, and combinations thereof.

In other examples of the antenna system, the at least one high-band antenna radiator element is a broadband antenna radiator element, having an operational bandwidth substantially greater than that of a corresponding dipole antenna element.

In some examples of the antenna system, the at least one high-band antenna radiator element is a flared notch antenna radiator element.

In other examples of the antenna system, the at least one high-band antenna radiator element provides an equivalent ground reference for the at least one low-band antenna radiator element.

In some examples of the antenna system, the system further includes one or more intermediate-band sub-systems, each of the intermediate-band sub-systems including one or more intermediate-band antenna radiator elements operable over an intermediate bandwidth at least partially overlapping any one of another bandwidth, including the first bandwidth, second bandwidth, another intermediate bandwidth, and combination thereof, and one or more intermediate-band antenna sub-system ports providing one or more intermediate-band sub-system port signals. The signal processor, in the receive mode, weights and combines the one or more low-band sub-system port signals, one or more high-band sub-system port signals, and one or more intermediate-band sub-system port signals to provide, at the one or more full-band ports, uninterrupted continuous full-band frequency coverage whose extent covers the full frequency range of the low-band, high-band, and intermediate-band. The signal processor, in a transmit mode, separates and weights one or more provided full-band input port signals into one or more low-band sub-system output port signals, one or more high-band sub-system output signals, and one or more intermediate-band sub-system port output signals, such that a radio frequency field radiating from the low-band, high-band, and intermediate-band antenna sub-systems, combined, provides uninterrupted continuous full-band frequency coverage whose extent covers the full frequency range of the low-band, high-band, and intermediate-band.

In some examples of the process, weighting and combining the one or more low-band sub-system port signals and one or more high-band sub-system port signals, and separating and weighting the one or more provided full-band input port signals includes conjugate weight matching.

In some examples of the process, the low-band antenna sub-system includes a plurality of low-band antenna radiator elements and the high-band antenna sub-system includes a plurality of high-band antenna radiator elements.

In other examples of the process, the process further includes interleaving the at least one low-band antenna radiator element with the at least one high-band antenna radiator element within the common antenna aperture.

In other examples of the process, the process includes electronically steering the at least one low-band antenna radiator element and the at least one high-band antenna radiator element across a scan angle measured with respect to the common antenna aperture.

In other examples of the process, the process includes mechanically steering the at least one low-band antenna radiator element and the at least one high-band antenna radiator element across a scan angle measured with respect to the common antenna aperture.

In some examples of the process, a polarization of the at least one low-band antenna radiator element and the at least one high-band antenna radiator element is selected from the group consisting of: linear polarization; cross polarization; elliptical polarization; and circular polarization.

In other examples of the process, the process further includes converting the one or more low-band sub-system port signals and the one or more high-band sub-system port signals between respective digital and analog signal representations.

In some examples of the process, the process includes storing in an electronically accessible memory, respective predetermined weighting parameters for the at least one low-band antenna radiator element and the at least one high-band antenna radiator element.

In other examples of the process, includes determining from a lookup table, respective predetermined weighting parameters arranged according to one or more of frequency and antenna array scan angle.

In some examples of the process, the process further includes providing within the common antenna aperture one or more intermediate-band sub-systems, each of the intermediate-band sub-systems including one or more intermediate-band antenna radiator elements operable over an intermediate bandwidth at least partially overlapping any one of another bandwidth, including the first bandwidth, second bandwidth, another intermediate bandwidth, and combination thereof, and one or more intermediate-band antenna sub-system ports providing one or more intermediate-band sub-system port signals. The process, in the receive mode, includes weighting and combining the one or more low-band sub-system port signals, one or more high-band sub-system port signals, and one or more intermediate-band sub-system port signals to provide, at the one or more full-band ports, uninterrupted continuous full-band frequency coverage whose extent covers the full frequency range of the low-band, high-band, and intermediate-band. The process, in the transmit mode, includes separating and weighting one or more provided full-band input port signals into one or more low-band sub-system output port signals, one or more high-band sub-system port output signals, and one or more intermediate-band sub-system port output signals, such that a radio frequency field radiating from the low-band, high-band, and intermediate-band antenna sub-systems, combined, provides uninterrupted continuous full-band frequency coverage whose extent covers the full frequency range of the low-band, high-band, and intermediate-band.

Advantageously, examples of system and process, collectively "the technology," enable existing radiator technology with limited bandwidth capability to be combined into a single shared aperture with a greater continuous bandwidth capability. In some cases, the technology achieves bandwidth ratios of greater than 30:1. As another advantage, the technology increases continuous bandwidth capability using a relatively small number of low-band radiator elements interleaved with high-band radiator elements resulting in a smaller and lighter shared aperture.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

From a simplistic point of view, one approach is to physically interleave two or more separate subband radiator ESA sub-systems (e.g., a low-band radiator sub-system, high-band radiator subsystem, and possibly one or more intermediate-band radiator subsystems) in the same aperture to achieve a greater total bandwidth. This approach has been implemented successfully when the ESA subbands have a large frequency separation between them. However, if a continuous total bandwidth is desired, there must be overlap in the radiator subbands.

Figure 1:
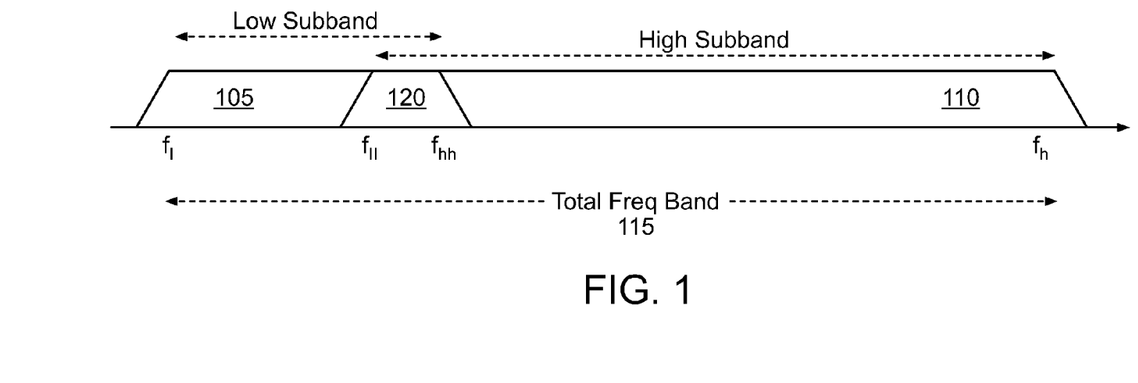
FIG. 1 is a diagram of a low-subband radiator element(s) and high-subband radiator element(s) overlapping in a single aperture.

FIG. 1 shows a low subband array 105 (frequencies between Fl and Fll) and high subband array 110 (frequencies between Fh and Fhh) combined in a single aperture. The single aperture has a total frequency band 115 (frequencies between Fl and Fh). The low subband array 105 and high subband array 110 overlap forming an overlap band 120 (frequencies between Fll and Fhh). The overlap in the radiator subbands leads to inevitable interactions between subband radiators 105 and 110 in the overlap band 120 and surrounding regions causing intolerable antenna gain variation and loss in both ESA subsystems in the region surrounding the overlap band 120. Thus, such interleaved subband ESAs cannot be used for achieving a continuous wider-band single aperture without a technique for compensating for the radiator interaction just described.

The technology described herein includes examples of an approach in which, in a receive mode, two or more signals, each of which correspond to the output of a group of radiator elements of a different subband, are weighted and combined. In a transmit mode, a provided signal is separated and weighted into two or more signals, each of which correspond to an input into a group of radiator elements of a different subband. For ease of reference, in the receive mode, the approach may be called "weighted combination" and in the transmit mode, called "weighted separation." Further, the different subbands may be referred to as high, low, and intermediate subbands. In a convenient example of the approach, weighted combination and weighted separation compensate two or more subband ESA signals and sufficiently minimizes a consequent overlap region gain variation and loss to the point where a single-aperture continuous ultra-wideband ESA is feasible.

Figure 2:
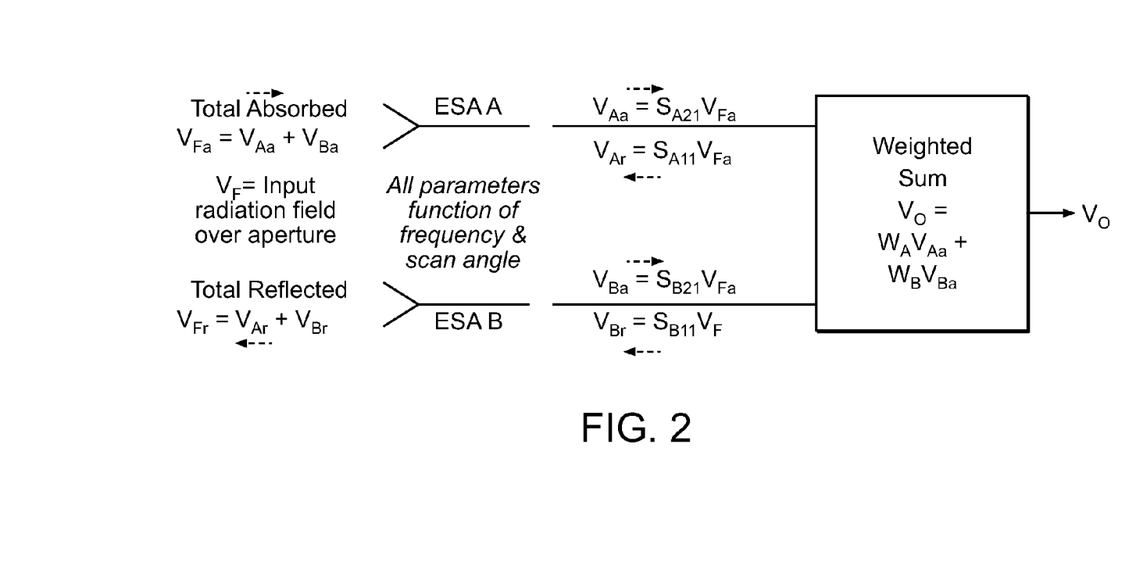
FIG. 2 is a diagram of an example of the approach of weighted combination and weighted separation.

FIG. 2 shows an example of weighted combination in which shared aperture subband ESAs signals are combined for a receive (Rx) ESA with conjugate match weighting. For the transmit case, reciprocity governs and, as such, an example of weighted separation is not shown. In FIG. 2, the subscripts "A" and "B" indicate the subbands (e.g., high-band and low-band), the subscript "F" indicates the full or total signal across the aperture, the subscript "a" indicates the absorbed signal, and the subscript "r" indicates the reflected signal.

In FIG. 2, V indicates complex amplitudes, S indicates scattering matrices, and WA and WB indicate the conjugate match complex weights.

As shown in FIG. 2, the weighted combination of the A and B absorbed complex amplitudes VAa and VBa is given by:

$$VO=WAVAa+WBVBa=(WASA21+WBSB21)VFa$$

Here, VFa is the total far-field complex amplitude absorbed by the aperture.

When the weights have the weighted combination solution:

$$WA=SA21*/K, WB=SB21*/K, K-1=|SA21|2+|SB21|2$$

it is straightforward to show that;

$$VO=VFa$$

Thus, the approach of weighted combination recovers the total absorbed far-field signal. That is, the weighted combination Vo recovers the total far-field signal to the extent that the combined ESA radiators (e.g. high-band subsystem radiator elements and low-band subsystem radiator elements) are properly impedance matched to the far-field. To maximize aperture efficiency, in some examples, it is preferable to design the sets of ESA radiators for good total match in the overlap region, as well as using the approach. In an example antenna system of overlapping antennas (described below in greater detail) in which the approach is followed, the overlapping antennas are designed so that the combined antennas match into the far radiation field in the overlapping regions. That is, the combined antennas do not reflect a received signal or efficiently transmit the signal in the overlapping regions.

In other examples of the approach, for further extensions in bandwidth, the foregoing is repeated with more than two sets of subband radiator elements. Thus, the extension of the approach to achieve even greater continuous total bandwidths is possible (subject to the added complication of matching more subband radiators in their overlap regions and minimizing added blockage). For dual polarization operation, other examples of the approach can be used for optimizing co-polarization (co-pol) antenna gain and minimizing cross-polarization (cross-pol) interference.

In examples of the approach, the weighted combination (and weighted separation) solution is a function of frequency and scan angle (which may be because of mutual coupling and other factors). Some examples of the approach use calibration to generate weighted combination solutions versus frequency and scan. In a convenient example, these solutions are stored digitally in look-up tables for use during operation of an antenna system. In some examples of the approach, compensation can also be applied digitally during operation in digital sections of receivers and exciters. In other examples of the approach, compensation can be applied strictly in the analog domain. Some examples of the approach optimize compensation on the fly by using well-known signal-to-noise ratio (SNR) and similar measure real-time optimization loops (e.g., a least mean squares optimization algorithm).

While the example of the approach is described above in the context of conjugate match weighting, the approach contemplates other examples of weighted combination and weighted separation with other techniques for combining and separating multiple elements, such as a nulling algorithm, which optimally combines subbands while purposely notching out a section of the band for interference rejection purposes.

Figure 3:
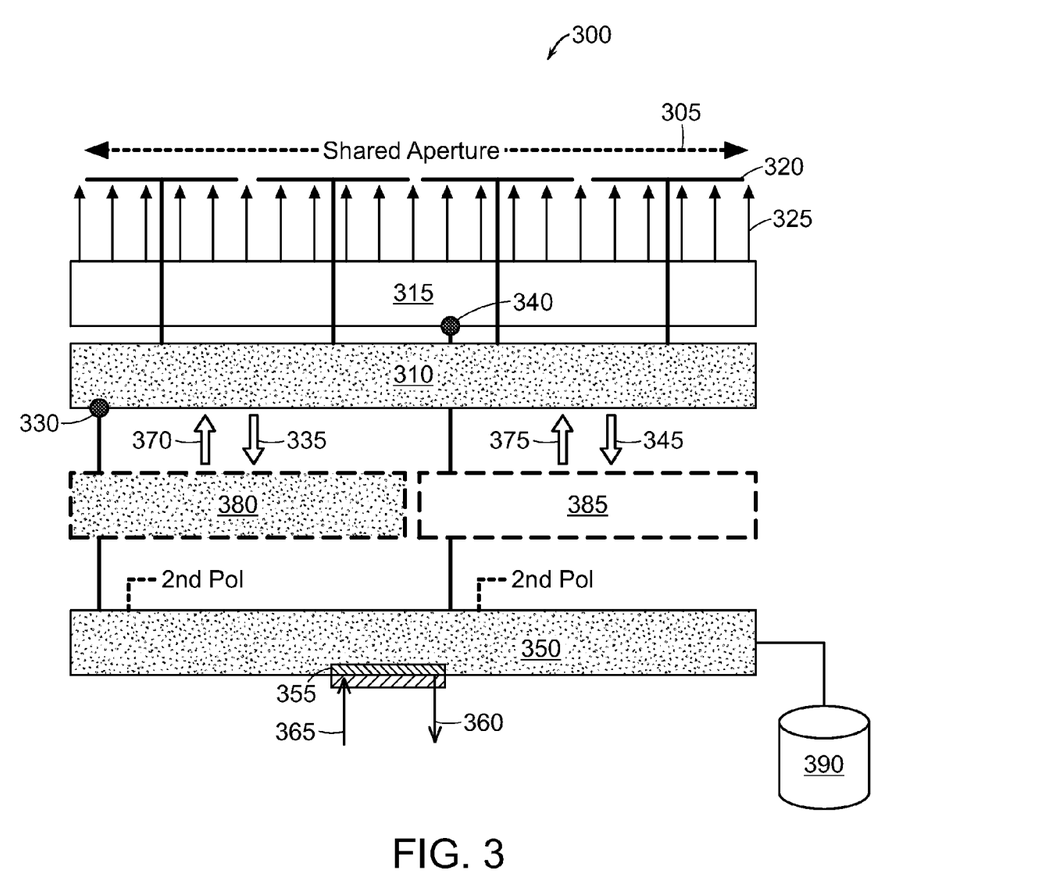
FIG. 3 is a block diagram of an example antenna system implementing the approach of weighted combination and weighted separation.

FIG. 3 shows an example antenna system 300 implementing the approach. The antenna system 300 includes a shared or common antenna aperture 305. The common antenna aperture 305 includes a low-band antenna sub-system 310 and high-band antenna sub-system 315. As shown, the low-band antenna sub-system 310 includes low-band antenna radiator elements 320 (or simply low-band radiators) operable over a first bandwidth. While the low-band antenna sub-system 310 is shown having several low-band radiators 320, other examples include any number of low-band radiators including one.

The high-band antenna sub-system 315 includes several high-band antenna radiator elements 325 (or simply high-band radiators) operable over a second bandwidth at least partially overlapping the first bandwidth. Again, while the high-band antenna sub-system 315 is shown having several high-band radiators 325, other examples include any number of high-band radiators including one.

In some examples of the example antenna system 300, at least one subband antenna radiator element (e.g., low-band antenna radiator element 320) is selected from a group consisting of monopoles, dipoles, crossed dipoles, patches, flared notches, and combinations thereof. In other examples, at least one subband antenna radiator element (e.g., high-band antenna radiator element 325) is a broadband antenna radiator element, having an operational bandwidth substantially greater than that of a corresponding dipole antenna element. In some examples of the antenna system, at least one subband antenna radiator element (e.g., high-band antenna radiator element 325) is a flared notch antenna radiator element. In other examples of the antenna system, at least one subband antenna radiator element (e.g., high-band antenna radiator element 325) provides an equivalent ground reference for the low-band antenna radiator element 320.

In a convenient example of the antenna system 300, the subband radiators consist of 0.4 to 1.5 GHz crossed connected-dipole long-filament dual-polarization radiators (existing capability>4:1 bandwidth ratio) interleaved with 1.5 to 13.5 GHz modified Vivaldi radiators (existing capability>9:1 bandwidth ratio). In this configuration, the shared antenna aperture 305 has a total continuous 3 dB bandwidth of 0.4 to 13.5 GHz (i.e., >33:1 bandwidth ratio).

In the example antenna system 300, the same set of low-band and high-band radiators 305 and 320 feed both the transmit and receive antenna sub-systems 310 and 315 utilizing individual element duplexers or diplexers.

In the example antenna system 300, the low-band antenna sub-system 310 includes a low-band antenna sub-system port 330 providing a low-band sub-system port signal 335 generated using well-known ESA beamforming techniques to combine (receive) element signals in phase in the appropriate beam pointing direction at the subsystem port, or separate similarly separate (transmit) the port signal into element signals that add in phase in the appropriate beam pointing direction in the far antenna field. The high-band antenna sub-system 315 includes a high-band antenna sub-system port 340 providing a high-band sub-system port signal 345, in a fashion similar to that of the low-band subsystem. In other examples of the antenna system 300, one or both of the low-band antenna sub-system 310 and high-band antenna sub-system 315 each have more than one sub-system port providing a respective port signal. For example, for a subsystem having two polarizations in operation, there are two subband output ports, one for each polarization. In this case, FIG. 2 is duplicated for each polarization.

The antenna system 300 includes a signal processor 350 electrically coupled to the low-band sub-system port 330 and high-band sub-system port 340, and to a full-band port 355. The signal processor 350 carries out an example of the approach described above with reference to FIG. 2. In receive mode, the signal processor 350 weights and combines the low-band port signal(s) 335 and high-band sub-system port signal(s) 345 into a full-band port output signal(s) 360. The full-band port output signal 360 covers an uninterrupted continuous full-band frequency over a combined bandwidth whose extent covers the full frequency range of all subbands (low-band and high-band in this example). The signal processor 350 provides the full-band port output signal 360 to the full-band port 355.

In transmit mode, the signal processor 350 separates and weights a provided full-band port input signal(s) 365 into at least one low-band sub-system output port signal 370 and at least one high-band sub-system port output signal 375. The signal processor 350 separates and weights such that a radio frequency field radiating from the low-band antenna sub-system 310 and high-band sub-system 315 combined provides uninterrupted continuous full-band frequency coverage whose extent covers the full frequency range of all subbands (low-band and high-band in this example).

While the example antenna system 300 described above involves compensation for a case of a single-aperture ESA with two sets of interleaved high and low band radiator sub-systems, it should be readily apparent to those skilled in the art that the approach can be generalized to include more than two sets of radiator sub-systems with intermediate-band radiators and non-ESA antennas with multiple feed radiators.

FIG. 3 shows the example antenna system 300 with optional digital receiver/exciters (signal converters) 380, 385 in electrical communication between the signal processor 350 and the low-band antenna sub-system 310 and the high-band antenna sub-system 315. The digital receiver/exciters 380, 385 are adapted to convert between digital and analog signal representations. The digital receiver/exciters 380, 385 convert the separate ESA inputs/outputs 370, 375 to the digital domain making it easier to implement the signal processor 350. Other examples of the antenna system 300 use analog receiver/exciters.

A convenient example of antenna system 300 includes an electronically accessible memory 390 in electrical communication with the signal processor 350. The electronically accessible memory 390 stores respective predetermined weighting parameters for the at least one low-band antenna radiator element 320 and the at least one high-band antenna radiator element 325. For example, the electronically accessible memory stores 390 weighted combination/separation solutions described above with reference to FIG. 2.

To summarize, some examples of the antenna system 300 optimally weight subband (and possibly polarization) signals in forming combined/split subband (and possibly polarization) signals for receive or transmit. Other examples of the antenna system 300 use frequency and angle of arrival (AOA) look-up tables to form optimum weights. In the aforementioned examples of the antenna system 300, the weighting corrects for radiator interactions in the overlapping band to produce the optimum combined receive or transmit signals. A convenient example of the antenna system 300 uses similar weighting to correct radiator dual polarization imperfections.

Figure 4:
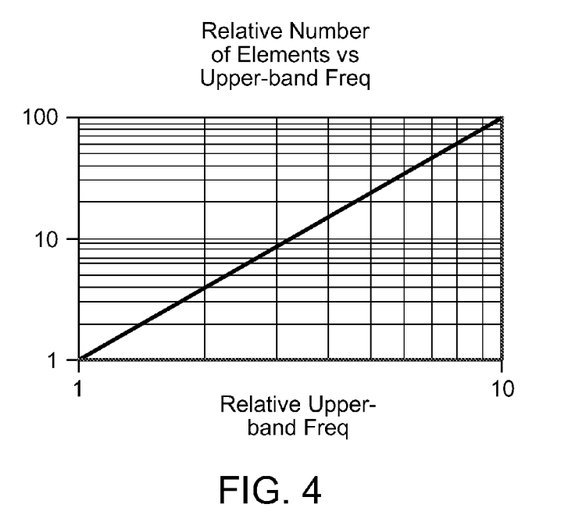
FIG. 4 is a chart of relative number of elements versus upper-band frequency.

FIG. 4 shows that only a relatively small number of low-band radiator elements are needed to extend the low end of a total (full) radio frequency (RF) band to satisfy grating lob requirements. Accordingly, extending the bandwidth of an ESA aperture by adding interleaved low subband radiator elements to the high subband radiator elements, adds little size and weight to the single ESA aperture described above with reference to FIG. 2. In contrast, systems known in the art with two separate apertures to cover the continuous band in sections doubles the aperture area needed and have a much higher weight penalty to support the added aperture structure.

Figure 5:
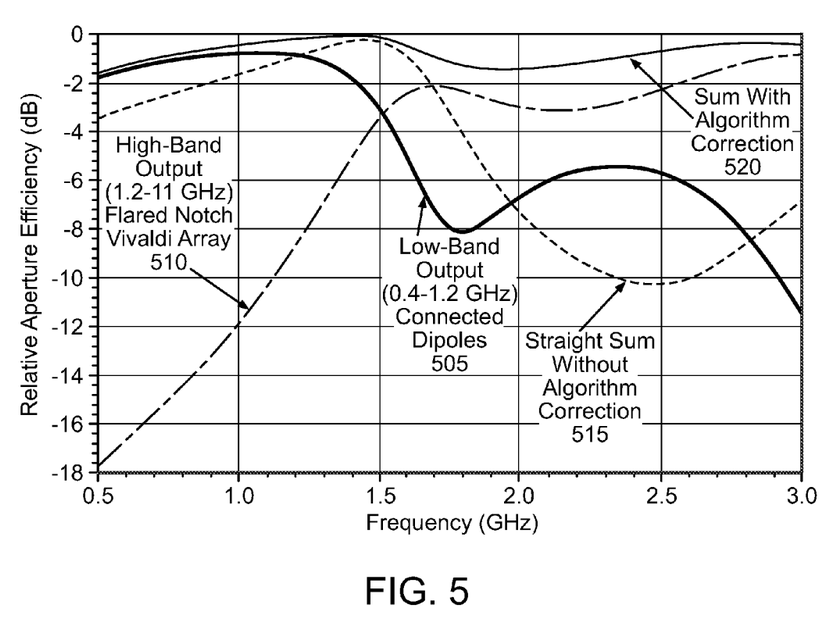
FIG. 5 shows exemplary benefits and effectiveness of the approach of weighted combination and weighted separation.

FIG. 5 shows exemplary benefits and effectiveness of the approach of weighted combination and weighted separation in a typical example. FIG. 5 shows co-pol relative loss results for the example antenna system 300 of FIG. 3, emphasizing the region around the overlap band. Curves 505 and 510 show the separate performances of the low-band antenna sub-system 310 and high-band antenna sub-system 315, respectively, without the other sub-system being present. Curve 515 is the result of a straight sum without the approach (i.e., without compensation). As shown in FIG. 5, the interaction region where loss is high extends far beyond the nominal overlap band.

Curve 502 is the result with approach (i.e., with compensation). In the region shown in FIG. 5, there is about a 1.6 dB peak-to-peak variation in the compensated sum. Outside this region, there is little interaction between subband radiators, and the performance corresponds that of the appropriate individual subband radiators. In FIG. 5, the demonstrated full bandwidth ratio (highest divided by lowest frequency) is 27.5:1 with good total match to the radiation field for high aperture efficiency. Through further parameter manipulation, this technique can achieve a continuous bandwidth ratio of >30:1 at high aperture efficiency in a single shared aperture with little ripple using existing radiator technology.

The above-described approach can be implemented in digital electronic circuitry, in computer hardware, firmware, and/or software. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit suitable for use in a computing environment to carry out the features and functions of various examples discussed herein. A computer program can be deployed to be executed on one computer or on multiple computers at one site.

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

Signal processor 345 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., flash or similar solid state memory, magnetic, magneto-optical disks, or optical disks). The memory may be a tangible non-transitory computer-readable storage medium having computer-readable instructions stored therein for processing images, which when executed by one or more processors (e.g., image processor 100) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described approach can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described approach can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

"Comprise," "include," and/or plural forms of each are open ended and include the listed parts and can include additional parts that are not listed. "And/or" is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. An antenna system, comprising:
   a common antenna aperture, comprising:
      a low-band antenna sub-system including at least one low-band antenna radiator element operable over a first bandwidth and one or more low-band antenna sub-system ports providing one or more low-band sub-system port signals;
      a high-band antenna sub-system including at least one high-band antenna radiator element operable over a second bandwidth, at least partially overlapping the first bandwidth, and one or more high-band antenna sub-system ports providing one or more high-band sub-system port signals;
      a signal processor electrically coupled to one or more full-band ports, and electrically coupled to each of the low-band antenna sub-system ports and high-band antenna sub-system ports, wherein the signal processor, in a receive mode, weighting and combining the one or more low-band sub-system port signals and one or more high-band sub-system port signals to provide, at the one or more full-band ports, uninterrupted continuous full-band frequency coverage whose extent covers the full frequency range of a low-band and high-band, and wherein the signal processor, in a transmit mode, separating and weighting one or more provided full-band input port signals into one or more low-band sub-system output port signals and into one or more high-band sub-system port output signals, such that a radio frequency field radiating from the low-band and high-band antenna sub-systems, combined, provides uninterrupted continuous full-band frequency coverage whose extent covers the full frequency range of the low-band and high-band.

2. The system of claim 1, wherein the signal processor weights and combines the one or more low-band sub-system port signals and one or more high-band sub-system port signals, and separates and weights the one or more provided full-band input port signals with conjugate weight matching.

3. The system of claim 1, wherein the low-band antenna sub-system includes a plurality of low-band antenna radiator elements and the high-band antenna sub-system includes a plurality of high-band antenna radiator elements.

4. The system of claim 3, wherein the plurality of low-band antenna radiator elements are interleaved with the plurality of high-band antenna radiator elements, within the common antenna aperture.

5. The system of claim 1, wherein the at least one low-band antenna radiator element and the at least one high-band antenna radiator element are electronically steerable across a scan angle measured with respect to the common antenna aperture.

6. The system of claim 1, wherein the at least one low-band antenna radiator element and the at least one high-band antenna radiator element are mechanically steerable in a single aperture antenna across a scan angle.

7. The system of claim 1, wherein a polarization of the at least one low-band antenna radiator element and the at least one high-band antenna radiator element are selected from the group consisting of: linear polarization; cross polarization; elliptical polarization; and circular polarization.

8. The system of claim 1, further comprising at least one signal converter in electrical communication between the signal processor and the low-band antenna sub-system and the high-band antenna sub-system, the signal converter adapted to convert between digital and analog signal representations.

9. The system of claim 1, further comprising an electronically accessible memory in electrical communication with the signal processor, the electronically accessible memory storing respective predetermined weighting parameters for the at least one low-band antenna radiator element and the at least one high-band antenna radiator element.

10. The system of claim 9, wherein the respective predetermined weighting parameters are arranged in a lookup table according to one or more of frequency and antenna array scan angle.

11. The system of claim 1, wherein the at least one low-band antenna radiator element is selected from the group consisting of: monopoles, dipoles, crossed dipoles, patches, flared notches, and combinations thereof.

12. The system of claim 1, wherein the at least one high-band antenna radiator element is a broadband antenna radiator element, having an operational bandwidth substantially greater than that of a corresponding dipole antenna element.

13. The system of claim 1, wherein the at least one high-band antenna radiator element is a flared notch antenna radiator element.

14. The system of claim 1, wherein the at least one high-band antenna radiator element provides an equivalent ground reference for the at least one low-band antenna radiator element.

15. The system of claim 1, further comprising one or more intermediate-band sub-systems, each of the intermediate-band sub-systems including one or more intermediate-band antenna radiator elements operable over an intermediate bandwidth at least partially overlapping any one of another bandwidth, including the first bandwidth, second bandwidth, another intermediate bandwidth, and combination thereof, and one or more intermediate-band antenna sub-system ports providing one or more intermediate-band sub-system port signals;
   wherein the signal processor, in the receive mode, weighting and combining the one or more low-band sub-system port signals, one or more high-band sub-system port signals, and one or more intermediate-band sub-system port signals to provide, at the one or more full-band ports, uninterrupted continuous full-band frequency coverage whose extent covers the full frequency range of the low-band, high-band, and intermediate-band; and
   wherein the signal processor, in the transmit mode, separating and weighting one or more provided full-band input port signals into one or more low-band sub-system output port signals, high-band sub-system port output signals, and intermediate-band sub-system port output signals, such that a radio frequency field radiating from the low-band, high-band, and intermediate-band antenna sub-systems, combined, provides uninterrupted continuous full-band frequency coverage whose extent covers the full frequency range of the low-band, high-band, and intermediate-band.

16. A method for processing signals, comprising:
providing within a common antenna aperture a low-band antenna sub-system including at least one low-band antenna radiator element operable over a first bandwidth and one or more one low-band antenna sub-system ports providing one or more low-band sub-system port signals;
providing within the common antenna aperture a high-band antenna sub-system including at least one high-band antenna radiator element operable over a second bandwidth, at least partially overlapping the first bandwidth, and one or more high-band antenna sub-system ports providing one or more high-band sub-system port signals;
in a receive mode, weighting, independently, the one or more low-band sub-system port signals and one or more high-band sub-system port signals, and combining the one or more low-band sub-system port signals and one or more high-band sub-system port signals to provide one or more full-band port signals covering an uninterrupted continuous full-band frequency over a combined bandwidth greater than either of the first or second bandwidths; and
in a transmit mode, separating one or more provided full-band input port signals into one or more low-band sub-system output port signals and one or more one high-band sub-system port output signals, and weighting the one or more one low-band sub-system output port signals and the one or more high-band sub-system port output signals, such that a radio frequency field radiating from the low-band antenna sub-system and high-band sub-system, combined, provides uninterrupted continuous full-band frequency coverage.

17. The method of claim 16, wherein weighting and combining the one or more low-band sub-system port signals and one or more high-band sub-system port signals, and separating and weighting the one or more provided full-band input port signals includes conjugate weight matching.

18. The method of claim 16, wherein the low-band antenna sub-system includes a plurality of low-band antenna radiator elements and the high-band antenna sub-system includes a plurality of high-band antenna radiator elements.

19. The method of claim 18, further comprising interleaving the at least one low-band antenna radiator element with the at least one high-band antenna radiator element within the common antenna aperture.

20. The method of claim 16, further comprising electronically steering the at least one low-band antenna radiator element and the at least one high-band antenna radiator element in a single aperture antenna across a scan angle.

21. The method of claim 16, further comprising mechanically steering the at least one low-band antenna radiator element and the at least one high-band antenna radiator element across a scan angle measured with respect to the common antenna aperture.

22. The method of claim 16, wherein a polarization of the at least one low-band antenna radiator element and the at least one high-band antenna radiator element is selected from the group consisting of: linear polarization; cross polarization; elliptical polarization; and circular polarization.

23. The method of claim 16, further comprising converting the one or more low-band sub-system port signals and the one or more high-band sub-system port signals between respective digital and analog signal representations.

24. The method of claim 16, further comprising storing in an electronically accessible memory, respective predetermined weighting parameters for the at least one low-band antenna radiator element and the at least one high-band antenna radiator element.

25. The method of claim 16, further comprising determining from a lookup table, respective predetermined weighting parameters arranged according to one or more of frequency and antenna array scan angle.

26. The method of claim 16, further comprising:
providing within the common antenna aperture one or more intermediate-band sub-systems, each of the intermediate-band sub-systems including one or more intermediate-band antenna radiator elements operable over an intermediate bandwidth at least partially overlapping any one of another bandwidth, including the first bandwidth, second bandwidth, another intermediate bandwidth, and combination thereof, and one or more intermediate-band antenna sub-system ports providing one or more intermediate-band sub-system port signals;
in the receive mode, weighting and combining the one or more low-band sub-system port signals, one or more high-band sub-system port signals, and one or more intermediate-band sub-system port signals to provide, at the one or more full-band ports, uninterrupted continuous full-band frequency coverage whose extent covers the full frequency range of the low-band, high-band, and intermediate-band; and
in the transmit mode, separating and weighting one or more provided full-band input port signals into one or more low-band sub-system output port signals, one or more high-band sub-system port output signals, and intermediate-band sub-system port output signals, such that a radio frequency field radiating from the low-band, high-band, and intermediate-band antenna sub-systems, combined, provides uninterrupted continuous full-band frequency coverage whose extent covers the full frequency range of the low-band, high-band, and intermediate-band.

* * * * *